Figure 1:
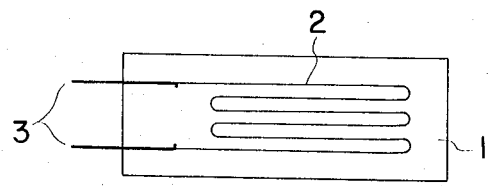

Feb. 21, 1967  TOSHIO DOI  3,305,817
ELECTRIC STRAIN GAUGE HAVING PLATINUM-PALLADIUM-MOLYBDENUM
ALLOY FILAMENT
Filed March 25, 1965

INVENTOR
TOSHIO DOI
BY
H. Edward Mestern 3,305,817
ELECTRIC STRAIN GAUGE HAVING PLATINUM-PALLADIUM - MOLYBDENUM ALLOY FILAMENT
Toshio Doi, Minamitama-gun, Tokyo-to, Japan, assignor to Kabushiki Kaisha Hitachi Seisakusho, Tokyo-to, Japan, a joint-stock company of Japan
Filed Mar. 25, 1965, Ser. No. 442,598
Claims priority, application Japan, Apr. 2, 1964, 39/8,297
3 Claims. (Cl. 338—2)

This invention relates to so-called electric strain gauges and more particularly to a new electric strain gauge in which the gauge filament is formed from a ternary alloy of platinum, palladium, and molybdenum.

It is an object of the present invention to provide an electric strain gauge which has a high gauge factor and other excellent characteristics, and which can be produced in a simple manner with little deviation of characteristics between products of the same production lot or different lots.

In an electric strain gauge, the variation of electrical resistance due to strain is utilized to measure said strain. Such strain gauges are not only used widely for strain measurements in general but are also used in recent years as mechanical-electrical conversion elements of industrial instruments such as self-balancing recorders.

An electric strain gauge generally consists of fine wire or foil of metal arranged in the form of a grid, for example, which is bonded closely against an object to be measured, and the variation in electrical resistance of the gauge when the object is subjected to strain is utilized to measure the strain. The sensitivity of such measuring is determined by the gauge factor GF, which may be expressed by the following equation.

$$GF = (1+2\nu) + (\Delta\rho/\rho)/(\Delta l/l)$$

where:

$\nu$ is the Poisson's ratio of the gauge filament material;
$\rho$ is the resistivity of the gauge filament material; and
$l$ is the length of the gauge filament.

Since the Poisson's ratio $\nu$ is approximately 0.3 in the case of a metal, it is necessary to cause the quantity of $(\Delta\rho/\rho)/(\Delta l/l)$ to be large in order to obtain a large value of GF.

That is, the principal features required for an electric strain gauge are: a high gauge factor; no variation of gauge factor with temperature; good linearity of the gauge factor; high electrical resistivity; low temperature coefficient of resistance; high proportional limit; homogeneity of material, undergoing little change with passage of time; little hysteresis; good workability, particularly into thin wire; good mechanical properties in general; ease of soldering and brazing; and high resistance against oxidation and corrosion.

The gauge factors, temperature coefficients of resistance, and resistivities of representative electric strain gauge materials used at present are shown in Table 1.

TABLE 1

| Material | Gauge Factor (GF) | Temp. Coeff. of Resistance ($\times 10^{-6}/°$ C.) | Resistivity, $\rho$ ($\mu\Omega$–cm.) |
|---|---|---|---|
| Cu-Ni | 2.12<br>2.1<br>2.12<br>2.05<br>2.04 | ±20 | 43–49 |
| Iso-Elastic | 3.56<br>3.53<br>3.6<br>3.6 | 470 | 80 |
| Ni-Cr | 2.55<br>2.1<br>2.63 | ±20 | 100–140 |
| Manganine | 0.47<br>0.5<br>0.47 | ±20 | 40–45 |
| Monel | 1.9 | 2,000 | 48 |
| Pt | 4.12 | 3,000 | 25 |

Of the materials shown in Table 1, the most widely used are the Cu-Ni alloys, which have low temperature coefficients of resistance and high resistivities but have gauge factors of the order of 2 and the disadvantages of high deviation (as much as 5 to 10 percent) in performances of products in one production lot or among different lots and low oxidation and corrosion resistance because these alloys are those of base metals. To overcome these disadvantages, noble metal alloys are also used, but none of the known materials can fully satisfy the aforementioned requirements.

It is an object of the present invention to overcome the above described disadvantages through the use of a ternary alloy of platinum, palladium, and molybdenum in fabricating strain gauges.

According to the present invention, there is provided an electric strain gauge formed from wire or foil made of a ternary alloy of platinum, palladium, and molybdenum, said strain gauge having a gauge factor of four or higher value, a relatively low temperature coefficient of resistance, a relatively high resistivity, and other characteristics which are superior to those of known electric strain gauges, and having low deviation in characteristics of products.

Figure 2:
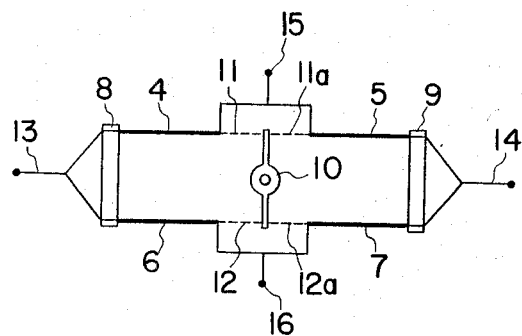

The nature and details of the invention will be more clearly apparent from the following detailed description with respect to preferred embodiments of the invention, taken in conjunction with the accompanying drawings in which:

FIG. 1 is a planar view showing an embodiment of the strain gauge according to the invention; and FIG. 2 is a planar view showing a state of application of another embodiment of the invention.

Referring to FIG. 1, there is illustrated a grid form single gauge of the adhesion type as an example of an electric strain gauge in which a metal thin wire is used. The gauge comprises a gauge base 1 consisting of an insulating flexible film such as, for example, paper, paper impregnated with bakelite, or polyester sheet, a gauge filament 2 bonded onto the gauge base 1, and lead wires 3.

FIG. 2 shows a strain gauge of non-adhesion type as illustrative of another embodiment of the invention. The gauge filament consists of four parts 4, 5, 6, and 7 assembled in bridge form, said parts being made principally of metal foil, and fixed by members 8 and 9. Reference numeral 10 designates a movable member such as, for example, a rotatable member coupled directly to a servomotor. The rotation of the movable member 10 is transmitted to the gauge parts 4, 5 and 6, 7 by means of the members 11, 11a and 12, 12a. Lead wires 13, 14, 15, and 16 are connected as shown.

Measured values of tensile strengths, resistivities, temperature coefficient of resistance, and gauge factors of alloys used for the electric strain gauge of this invention are shown in Table 2.

TABLE 2

| Composition (atomic percent) | | | Tensile Strength (kg./mm.²) | Resistivity (MΩ-cm.) | Temp. Coeff. of Resist., Cf ($\times 10^{-4}$/° C.) | Gauge Factor |
|---|---|---|---|---|---|---|
| Pt | Pd | Mo | | | | |
| 33 | 62 | 5 | 118 | 61.7 | 3.2 | 4.2 |
| 32 | 60 | 8 | 140 | 74.3 | 1.8 | 4.1 |
| 47 | 47 | 6 | 120 | 63.5 | 2.8 | 4.2 |
| 45 | 45 | 10 | 149 | 78.9 | 1.0 | 4.0 |
| 20 | 75 | 5 | 101 | 57.6 | 3.9 | 4.2 |
| 75 | 20 | 5 | 109 | 60.2 | 4.1 | 4.2 |

As is observable from Table 2, the gauge factor in all cases is 4 or higher, and the tensile strength is in the range of approximately from 100 to 150 kg./mm.², which is considerably high. At the same time it was found that these alloys have excellent workability and can be readily worked into thin wire. The resistivity of these alloys is in the range of approximately from 60 to 80 micro-ohm-cm., which is substantially high in comparison with those of Cu-Ni alloys and Pt.

Furthermore, the temperature coefficient of the alloy according to the invention is approximately $4 \times 10^{-4}$/° C. or lower. If this coefficient is of this order, it is readily possible by using a suitable compensation circuit to make the temperature coefficient of resistance of the entire system low. Moreover, by using a suitable elastic material (coefficient of expansion as) corresponding to the coefficient of expansion af, temperature coefficient of resistance Cf, and gauge factor GF of the present gauge, it is possible to attain the relationship of $$(\Delta R/R)_t = (as-af)GF\Delta t + Cf\Delta t = 0$$

In addition, since the filament materials of this invention are noble metal alloys, they have excellent resistance against oxidation and corrosion and are readily soldered and brazed. Furthermore, if care is exercised in their heat treatment, they are comparable to other metal materials on the point of exhibiting little variation with passage of time.

The deviation of temperature coefficient of resistance of samples of foil type strain gauges according to the invention after assembly is indicated in Table 3. As indicated in Table 3, the deviation between lots is of the order of from 0.3 to 0.4 percent, which indicates extremely good uniformity, particularly in comparison with deviation of from 5 to 10 percent in the case of a Cu-Ni alloy. This uniformity of characteristics is one of the superior features of the present invention.

TABLE 3

| Composition (atomic percent) | | | Lot No. | Temp. Coeff. of Resistance ($\times 10^{-6}$/° C.) |
|---|---|---|---|---|
| Pt | Pd | Mo | | |
| 33 | 62 | 5 | 1 | 320 |
| | | | 2 | 319 |
| | | | 3 | 319 |
| | | | 4 | 320 |
| | | | 5 | 321 |
| 47 | 47 | 6 | 1 | 280 |
| | | | 2 | 281 |
| | | | 3 | 282 |
| | | | 4 | 280 |
| | | | 5 | 280 |

Thus, the present invention provides an electric strain gauge having the following highly desirable features.

(1) A high gauge factor is afforded.
(2) The temperature coefficient of resistance is relatively low.
(3) The deviation of characteristics of products in one production lot or between products in different lots is very low in comparison with those of conventional electric strain gauges. Accordingly, the production can be greatly simplified.
(4) Oxidation resistance and corrosion resistance are excellent.
(5) The gauge filaments can be readily soldered or brazed.
(6) The gauge material has excellent workability and can be readily worked into thin wire or foil.
(7) The resistivity is of a suitable value.
(8) The tensile strength is substantially high, and, in accordance therewith, the proportional limit is high, whereby measurements of large strains can be accomplished.

The strain gauge of the invention also has other excellent characteristics, whereby the strain gauge can be effectively applied to a wide range of uses.

It should be understood, of course that the foregoing disclosure relates to only preferred embodiments of the invention and that it is intended to cover all changes and modifications of the examples of the invention herein chosen for the purposes of the disclosure, which do not constitute departures from the spirit and scope of the inventions as set forth in the appended claims.

What I claim is:

1. An electric strain gauge comprising at least one filament made of a ternary alloy consisting of 15-80 atomic percent platinum, 15-80 atomic percent palladium, and 2-15 atomic percent molybdenum.

2. The electric strain gauge as set forth in claim 1, wherein the gauge filament is in the form of a wire.

3. The electric strain gauge as set forth in claim 1, wherein the gauge filament is in the form of a foil.

(References on following page)

References Cited by the Examiner

UNITED STATES PATENTS

| | | | |
|---|---|---|---|
| 2,390,038 | 11/1945 | Ruge | 338—3 |
| 2,406,172 | 8/1946 | Smithells. | |
| 2,819,162 | 1/1958 | Cohn et al. | |
| 2,861,114 | 11/1958 | Nishimura. | |
| 3,202,951 | 8/1965 | Krinsky | 338—2 |
| 3,242,449 | 3/1966 | Stedman | 338—2 X |

RICHARD M. WOOD, *Primary Examiner.*

W. D. BROOKS, *Assistant Examiner.*